United States Patent [19]

Hassan et al.

[11] Patent Number: 5,940,117
[45] Date of Patent: Aug. 17, 1999

[54] METHOD FOR TRANSMITTING MULTIRESOLUTION IMAGE DATA IN A RADIO FREQUENCY COMMUNICATION SYSTEM

[75] Inventors: Amer Hassan, Cary; David G. Matthews, Raleigh, both of N.C.

[73] Assignee: Ericsson, Inc., RTP, N.C.

[21] Appl. No.: 08/682,043

[22] Filed: Jul. 16, 1996

[51] Int. Cl.$^6$ ................................................ H04N 7/14
[52] U.S. Cl. .................................................. 348/13; 345/328
[58] Field of Search ................................ 348/384, 12, 13, 348/426, 469; 358/260, 433; 345/328

[56] References Cited

U.S. PATENT DOCUMENTS

| | | | |
|---|---|---|---|
| 4,414,580 | 11/1983 | Johnson et al. | 358/260 |
| 4,654,484 | 3/1987 | Reiffel et al. | 379/53 |
| 4,672,444 | 6/1987 | Bergen et al. | 348/384 |
| 4,674,125 | 6/1987 | Carlson et al. . | |
| 4,682,869 | 7/1987 | Itoh et al. . | |
| 4,709,394 | 11/1987 | Bessler et al. . | |
| 4,718,104 | 1/1988 | Anderson . | |
| 4,870,497 | 9/1989 | Chamzas et al. | 348/426 |
| 4,931,954 | 6/1990 | Honda et al. . | |
| 5,050,230 | 9/1991 | Jones et al. . | |
| 5,119,081 | 6/1992 | Ikehira . | |
| 5,153,936 | 10/1992 | Morris et al. . | |
| 5,218,455 | 6/1993 | Kristy . | |
| 5,262,958 | 11/1993 | Chui et al. . | |
| 5,420,637 | 5/1995 | Zeevi . | |
| 5,426,513 | 6/1995 | Scorse et al. | 358/433 |
| 5,461,655 | 10/1995 | Vuylsteke et al. . | |
| 5,504,933 | 4/1996 | Saito | 348/13 |

FOREIGN PATENT DOCUMENTS

| | | |
|---|---|---|
| 0449529A2 | 3/1991 | European Pat. Off. . |
| WO 90/13966 | 11/1990 | WIPO . |
| WO 96/29818 | 9/1996 | WIPO . |

*Primary Examiner*—Victor R. Kostak
*Attorney, Agent, or Firm*—Rhodes, Coats & Bennett, L.L.P.

[57] ABSTRACT

The present invention relates to a method for transmitting multiresolution image data via wireless devices in a radio frequency communication system wherein images are decomposed into levels of resolution. The image data is stored in discrete information blocks in an image storage unit including a base image and one or more image details. The base image represents the coarsest resolution of the image. Each image detail, when added to the base image, improves the resolution of the image. An image display unit transmits a request for image data to the image storage unit. In response to the initial request, the base image is transmitted to the image display unit. If the base image is insufficient, the resolution can be increased incrementally by sending additional image data requests to transmit additional image detail. The additional image detail is then transmitted to the image display unit and recombined with the base image to provide a higher level of resolution to the image.

33 Claims, 5 Drawing Sheets

METHOD FOR TRANSMITTING MULTIRESOLUTION IMAGE DATA IN A RADIO FREQUENCY COMMUNICATION SYSTEM

FIELD OF THE INVENTION

The present invention relates to wireless communication systems and more particularly to a method for transmitting multiresolution image data via wireless devices in a radio frequency communication system.

BACKGROUND OF THE INVENTION

Multimedia applications are becoming an integral part in the design of wireline communication systems. These applications focus on the transmission of images, data, and speech over the same communication channel. A particular concern in multimedia applications is the transmission of images. An image comprises a two-dimensional signal that represents the relative luminances of objects in a scene. A scene may comprise, for example, a photograph, a video image, an X-ray image, or a radar image for a weather forecast. Two important parameters are the quality and the intelligibility of the image resulting from the transmission of the image data.

A typical image consists of a matrix of 512×512 pixels. For uncolored images, each pixel is described by a gray level and uses 8 bits of memory to store this information. The result is that the entire image occupies approximately 2 Mbits of memory. For a colored image, each pixel uses 24 bits and results in a image occupying approximately 6 Mbits of memory. Thus, a full-detail color image usually requires a lot of memory, bandwidth, and power consumption.

As a natural result of advances in technology, attention is being given to the transmission of multimedia signals via radio frequency communication. In the near future, this communication vehicle will become an important part of the service requirements for radio frequency communication systems. However, unlike wireline communication systems, radio frequency systems tend to be spectrally limited. In addition, service costs, in terms of air time charges, are significantly higher for the consumer. Images usually occupy large quantities of device memory and the transmission of image signals take a correspondingly long time. As such, it becomes quite expensive to transmit images via radio frequency systems such as mobile cellular radio networks. These resources need not be wasted if high resolution image transmission is not required. Therefore, a system is needed whereby the air time necessary to transmit images via radio frequency systems can be minimized in order to minimize costs to the user.

SUMMARY OF THE INVENTION

The present invention relates to a method for transmitting multiresolution image data via wireless devices in a radio frequency communication system.

This method uses wavelet techniques to decompose an image and store the image as discrete information blocks in an image storage unit. The information blocks include a base image, representing the lowest resolution of the image, and one or more image details which, when added to the base image, provide increasing levels of resolution. The maximum number of levels of resolution into which the image is decomposed may be determined by the resolution limits of the image storage unit or by artificial limitation on the image storage unit by the transmitting party.

After establishing a communication channel, the base image is transmitted to the image display unit. The image display unit includes means for incrementing the resolution of the image by sending image data requests to the image storage unit. Additional image details are then transmitted to the image display unit. The additional image detail received by the image display unit is then combined with the base image, again using wavelet techniques, to create a detail image of higher resolution. The image display unit may send multiple requests for additional image details. Each time, the additional image detail is combined with the previous image to provide a new detail image of higher resolution.

One advantage to decomposing the image into incremental levels of resolution is that only the level of resolution necessary to provide the agreed quality and intelligibility of the image is transmitted. For example, images such as handwritten notes may only require an intermediate or low level of image resolution to be intelligible. Bandwidth, power and transmission time are saved by transmitting a lower resolution. Images such as signatures or fingerprints may require high resolution to be effective for the purposes of the party receiving the communication. In such cases, the receiving party can request higher levels of resolution.

The required level of resolution can be determined by either party to the communication or the by the resolution limits of the communication devices. Representative applications of this concept include transmission of images from hand-held cellular radio devices or from laptop computers connected via an interface to a hand-held cellular radio devices. Therefore, it can be seen that the main advantage of this method will be to minimize air time and associated costs of radio frequency communication while allowing the users of the devices to determine the optimal level of resolution necessary to suit their needs.

DETAILED DESCRIPTION OF THE INVENTION

Figure 1:
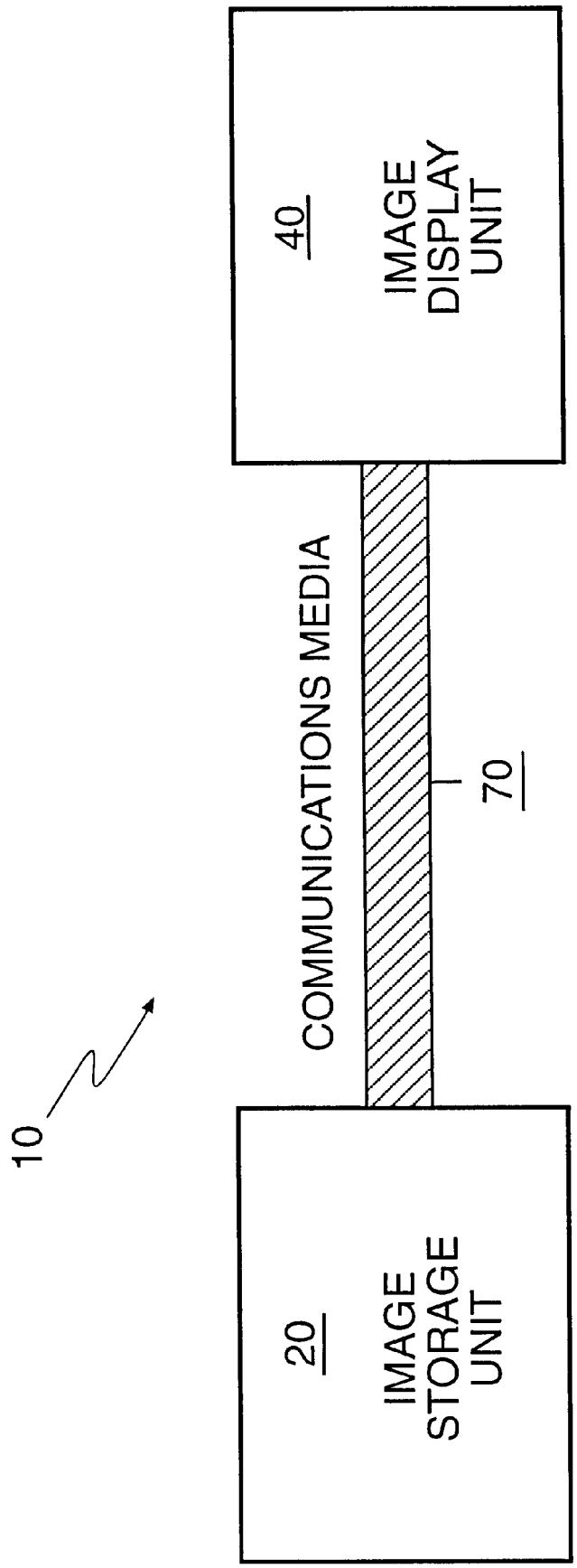
FIG. 1 is a general block diagram of the system configuration necessary for the implementation of the methodology of the present invention.

Referring now to the drawings, FIG. 1 shows the multiresolution transmission system, indicated generally by the numeral 10. The basic elements of the multiresolution transmission system 10 are an image storage unit generally numbered as 20, an image display unit generally numbered as 40, and a communications media 70 providing a communications link between the image storage unit 20 and the image display unit 40.

Figure 2:
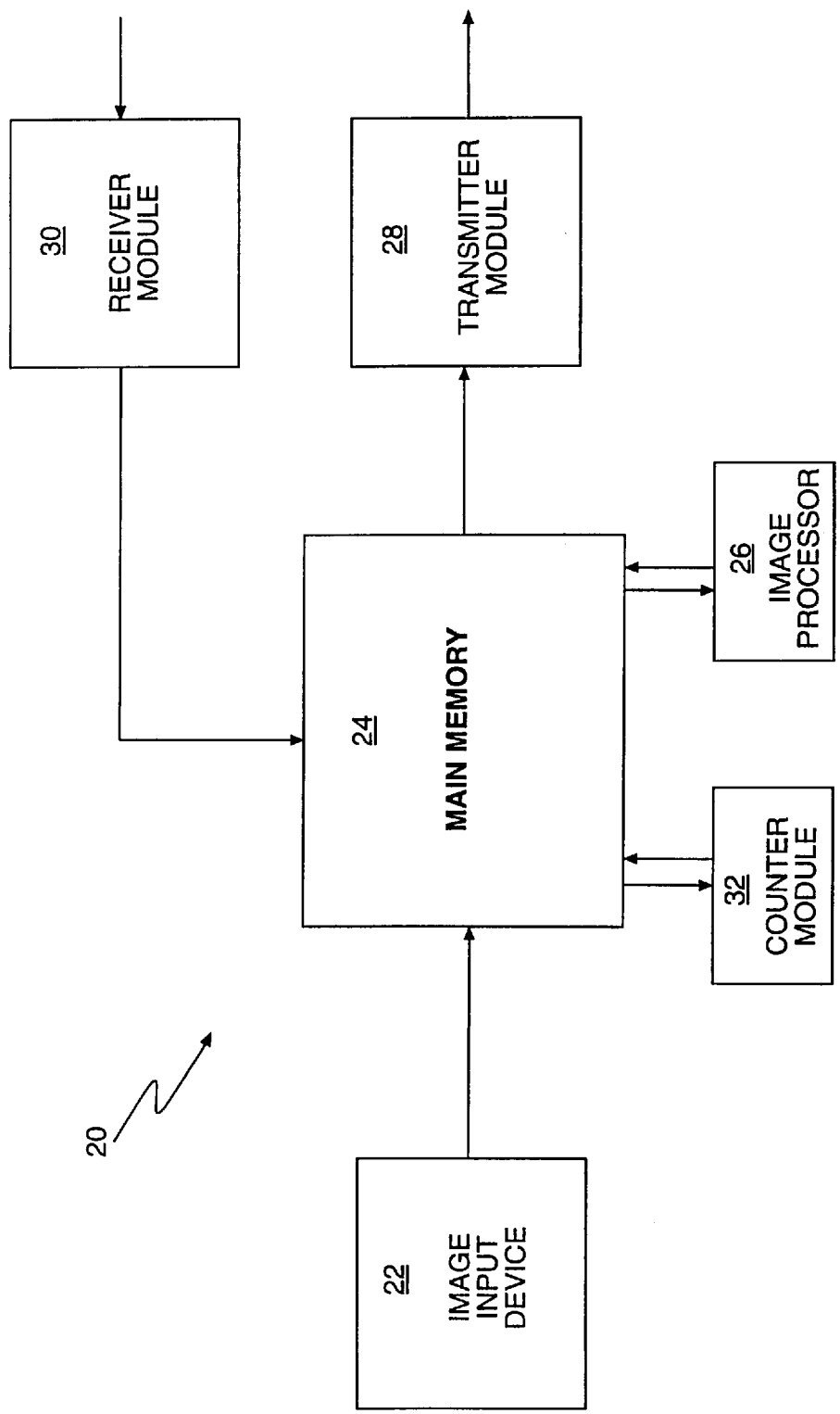
FIG. 2 is a block diagram of the image storage unit of the system and methodology embodied by the present invention.

FIG. 2 shows the image storage unit in greater detail. The image storage unit 20 comprises an image input device 22, a main memory 24, an image processor 26, a transmitter module 28, a receiver module 30, and a counter module 32. The purpose of the image storage unit 20 is to decompose an image and store the decomposed image in discrete information blocks. An image is input into the main memory 24 via an image input device 22. An image input device 22 may include, for example, a disk reader, a scanner, or an electronic drawing pad. The image is then decomposed by the image processor 26 into discrete information blocks which are stored in the main memory 24. The image may be decomposed, for example, by using wavelet techniques or other pyramidal image decomposition schemes. Such methods are well-known to those skilled in the art and therefore are not described herein. For a more detailed explanation of wavelet techniques, see S. G. Mallat, *A Theory for Multiresolution Signal Decomposition: The Wavelet Representation,* IEEE Transactions on Pattern Analysis and Machine Intelligence, vol. 11, no. 7, pp. 674–693 (July, 1989), which is incorporated herein by reference.

The transmitter module 28 is used to transmit the image data to a remotely located image display unit 40. Incoming requests for additional image details are directed through the receiver module 30. The main memory 24 is then ordered to transmit the requested data. The counter module 32 is also updated to maintain count of the number of transmitted information blocks. In practice, the image storage unit 20 may also be able to transmit additional image details without first receiving an image data request from the image display unit 40. This would be accomplished by a separate resolution control device incorporated into the image storage unit 20. In such instances, the user of the image storage unit 20 could transmit additional image details in response to a verbal request from the user of the image display unit 40. Control codes in the image data would then notify the display unit 40 of the nature of the incoming data.

Figure 3:
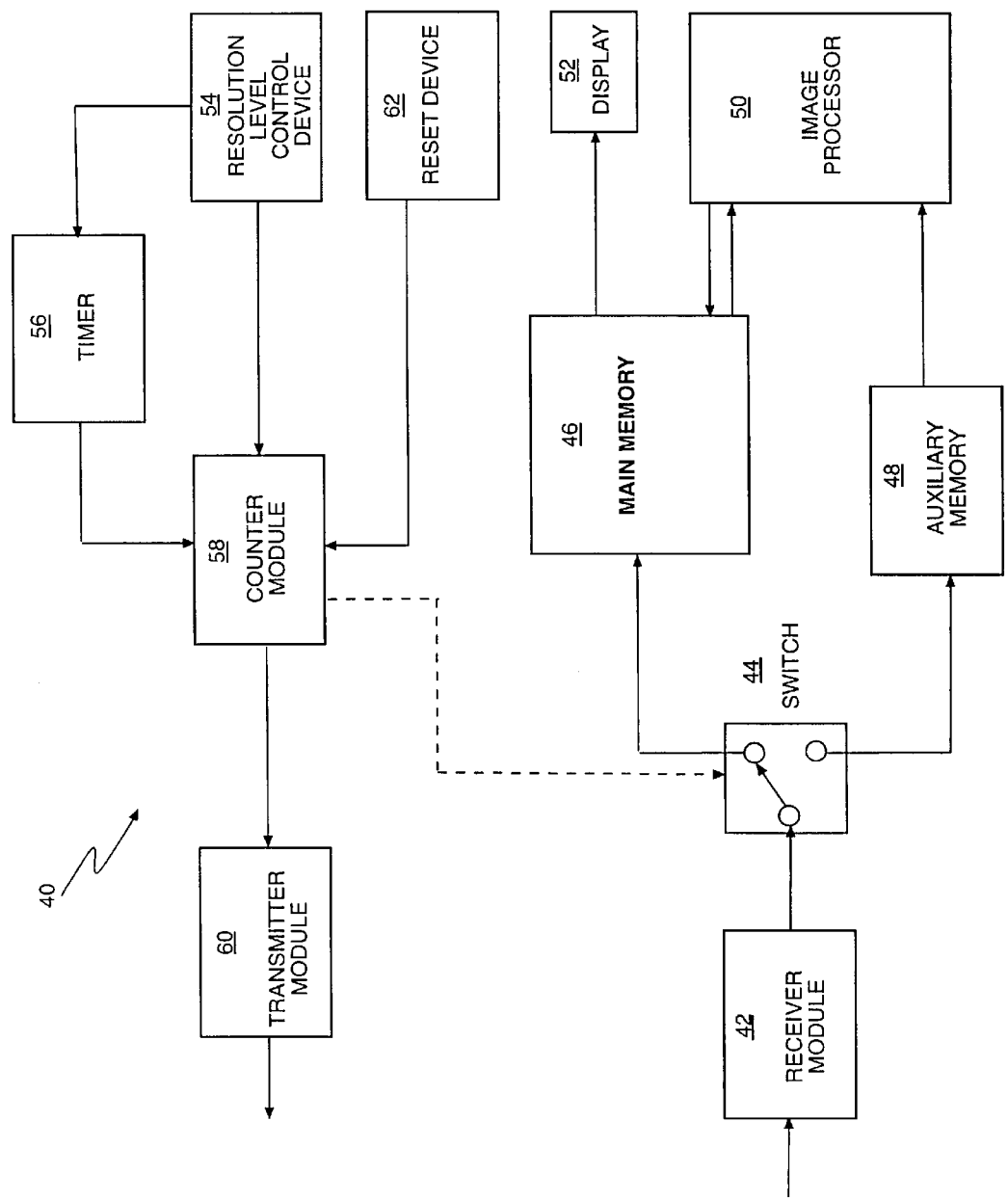
FIG. 3 is a block diagram of the image display unit of the system and methodology embodied by the present invention.

The display unit 40, shown in FIG. 3, comprises a receiver module 42, a switch 44, a main memory 46, an auxiliary memory 48, an image processor 50, a display 52, a resolution control device 54, a timer 56, a counter module 58, a transmitter module 60, and a reset device 62. Image data transmitted by the image storage unit 20 is received at the receiver module 42. The switch 44 directs the image data received to the main memory 46 or the auxiliary memory 48 as will be described below. In general, the original or base image is directed to the main memory 46 whereas any additional image details requested by the receiving party are routed to the auxiliary memory 48. The contents of both the main memory 46 and the auxiliary memory 48 are combined by the image processor 50 to form a recomposed image. The recomposed image, referred to herein as a detail image, is then stored in the main memory 48 and directed to the display 52.

The resolution control device 54 is used to increment the resolution of the image. The resolution control device 54 may, for example, comprise a push-button. Pushing the button 54 causes an image data request to be sent via the transmitter module 60 and the switch 44 to be set accordingly for routing of the incoming data. The counter module 58 keeps a count of the number of image data requests sent. The timer 56 is used to delay the transmission of the image data request so that multiple presses of the button 54 can be accumulated and sent as a single request. The reset device 62 is used to reset the counter module 58 and to send a reset signal to the image storage unit 20.

The communications media 70 illustrated in FIG. 1 comprises the means by which the image storage unit 20 communicates with the image display unit 40. While the means of communication is not unique to the present invention, it may comprise such methods as wireline, radio frequency, infrared, or microwave. Subclasses to the means of communication may be any channels which are dedicated for specific roles in the communication between the image storage unit 20 and the image display unit 40. In the present invention, a radio frequency means of communication is assumed.

To use the transmission system of the present invention, an image S is first decomposed using, for example, wavelet techniques into a base image $S_0$ and a series of image details $D_1, D_2, \ldots D_n$. Both the base image $S_0$ and the image details $D_1, D_2, \ldots D_n$ are stored in the main memory 24 of the image storage unit 20. The image details $D_1, D_2, \ldots D_n$ can be recombined with the base image $S_0$ to provide detail images. For example, $S_0$ combined with $D_1$ would provide a detail image of one resolution level above the base image. Similarly, $S_0$ combined with $D_1$ and $D_2$ would provide a detail image of two resolution levels above the base image. Following this concept, $S_0$ combined with $D_1, D_2, \ldots$ and $D_n$ would provide a detail image with the highest available level of resolution corresponding to the maximum original level of decomposition.

The image data stored in the image storage unit 20 is transmitted as discrete information blocks to the image display unit 40. When an image data request is received from the image display unit 40, the image storage unit 20 responds by sending the requested level of image data. Usually, only the base image is transmitted in response to the initial image data request. This image is most often an order of magnitude smaller than the original image. The initial image, however, may also comprise the base image and one or more details. In such case, the base image and the details are combined at the image storage unit 20 prior to transmission.

If more detail is required, the recipient can send additional image data requests (in real time) for more details. For each additional image data request, the image storage unit 20 responds by sending an information block containing the next level of image detail. At the image display unit 40, the image details are recombined with the base image and any previous image details received to improve the resolution of the image. If a request for multiple image details is received by the image storage unit 20, the corresponding number of information blocks containing the next levels of image detail are transmitted sequentially to the image display unit 40 before being recombined with the previous image to further increase the resolution.

Note that the user of the image storage unit 20 may be able to designate specific image display units 40 which would be able to receive multiresolution image data. In practice, an example of this imposed limitation in a radiotelephone communication system would be where the user of the image storage unit 20 programs certain authorized telephone numbers into the device. As a result, only callers from those specific telephone numbers with image display units 40 would have full multiresolution image data reception capability. Callers from numbers other than those specifically authorized by the user of the image storage unit 20 would receive either no image data or image data at a preset level of resolution. Thus, the blocking of all image data transmission would comprise a security feature to prevent reception of images by unauthorized parties. The transmission of only the marginally usable base image to unauthorized numbers may also have a similar security effect. However, transmission of any higher level of resolution, such as the base image combined with a number of image details, may be set by the user of the image storage unit 20 in order to limit air time required for transmission. The user of the image storage unit 20 may determine that an intermediate level of resolution is all that the receiving party needs and would transmit only that level. Therefore, this option will assist both in the security and in the optimization of bandwidth, power and transmission time parameters of image transmission.

Figure 4:
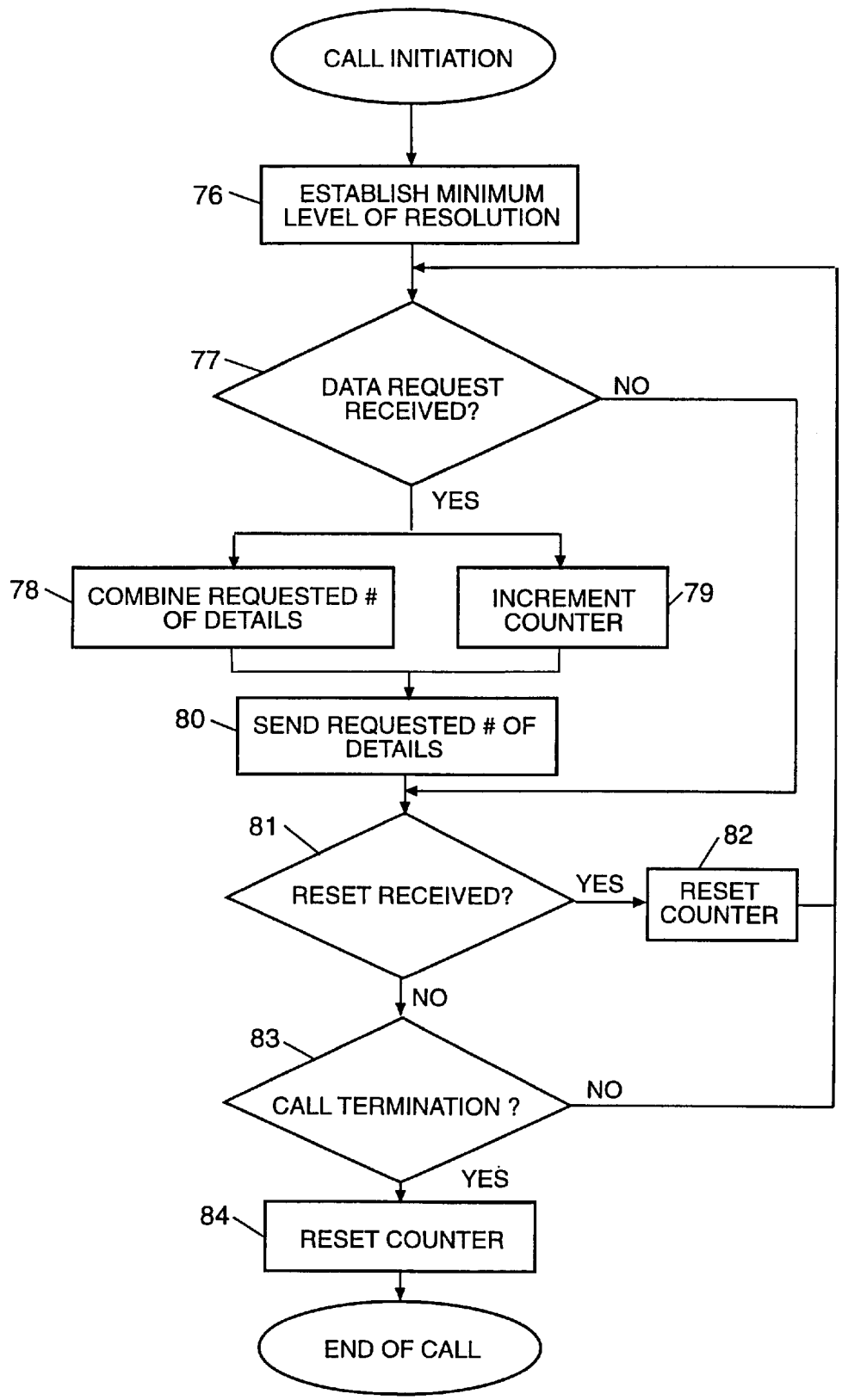
FIG. 4 is a flow diagram illustrating the operation of the image storage unit of the present invention.
Figure 5:
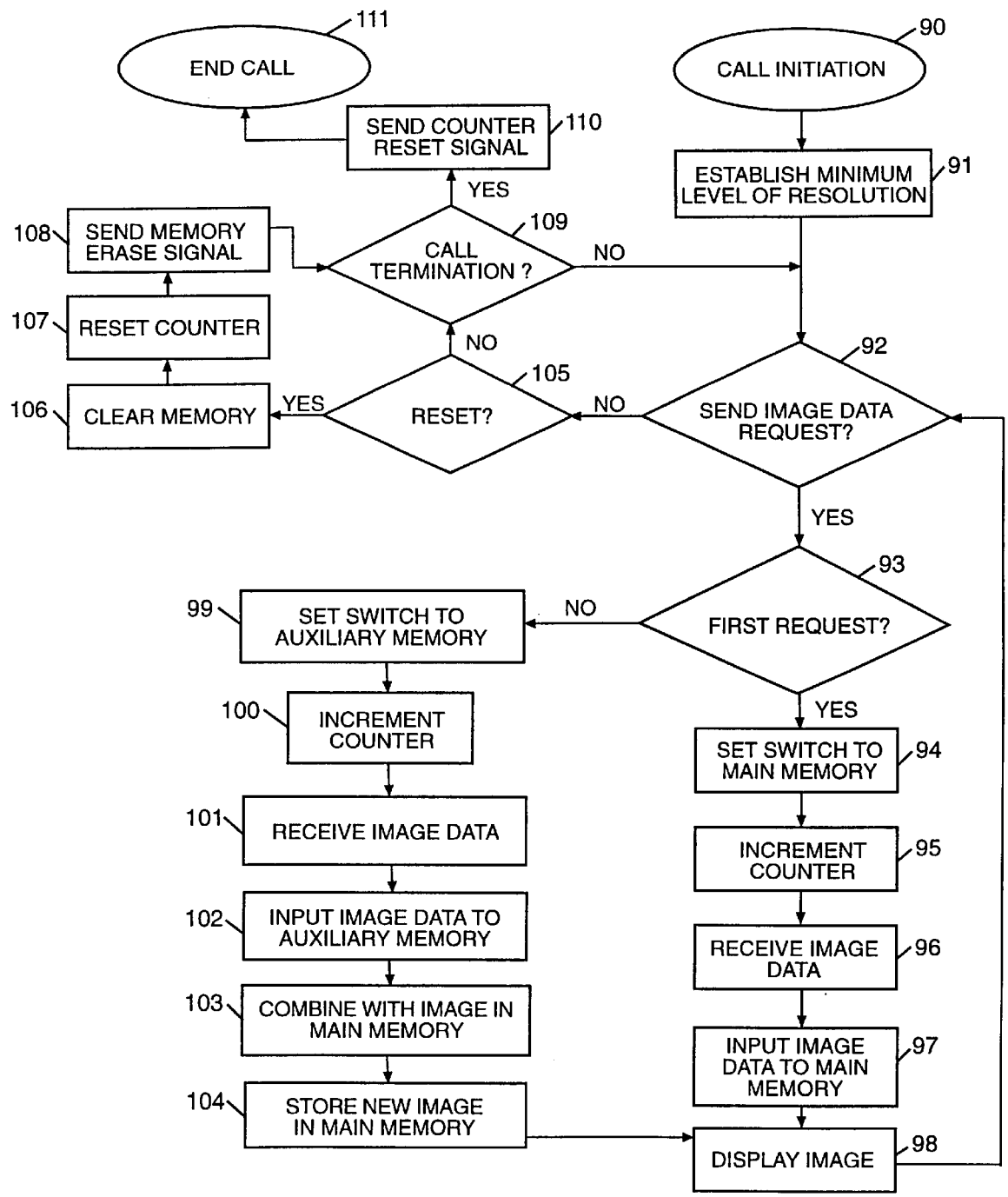
FIG. 5 is a flow diagram illustrating the operation of the image display unit of the present invention.

Referring now to FIGS. 4 and 5, the operations of the image storage unit 20 and image display unit 40 are shown in greater detail. During the call initiation, each party to the communication establishes the initial level of resolution to be transmitted, such as $S_0$ or $S_0$ and $D_1$, etc. The step of establishing the minimum level of resolution is indicated by function block 76 (FIG. 4) for the image storage unit 20 and function block 91 (FIG. 5) for the image display unit 40. Typically, this level would be preset in both the image storage unit 20 and the image display unit 40 by the respective user. If the level specified by each party is different, the minimum of the two values would be the limiting initial parameter.

In addition to setting a minimum level of resolution, the transmitting party may also be able to specify the maximum level of resolution available to the receiving party. The maximum level of resolution set by the transmitting party may be less than the resolution of the original image when initially input into the system. For instance, the image may have originally been decomposed into a base image and seven additional image details. The transmitting party could limit the maximum available resolution to four additional image details. Accordingly, the receiving party would only be able to receive a maximum resolution of the base image with four additional image details, not the full resolution of the original image. This feature is useful where the transmitting party bears the cost of the communication and seeks to limit the air time required for the image transmission.

After the minimum level of resolution has been established, image transmission starts when an image data request is sent from the image display unit 40 to the image storage unit 20 via a dedicated control channel DCC such as the fast associated control channel (FACCH) or the slow associated control channel (SACCH). Note that a dedicated control channel DCC may be utilized for the image data request since no image data is sent. An additional factor which would require such a dedicated control channel DCC is if a conversation was also in progress during the transmission of the imaging sequence.

Referring now to FIG. 4, the operation of the image storage unit 20 is shown. When an image data request is received by the image storage unit 20 (decision block 77), the image storage unit 20 transmits the requested number of information blocks to the image display unit 40. (function block 80). As generally indicated by function block 78, when the first image data request is received, the image storage unit 20 transmits an information block containing the base image. Thereafter, the image storage unit 20 transmits an information block containing the next level of image detail in response to each image data request. If a request for multiple information blocks is received, the image storage unit 20 either combines the multiple details into a single information block or combines the requested number of blocks in a sequential string corresponding to the increasing level of detail over the base image (function block 78). As indicated by function block 79, each time a request for image data is received, the counter module 32 increments the count to ensure that the number of information blocks does not exceed the maximum levels of detail available for that image.

After an acceptable image has been transmitted to the image display unit 40, the receiving party may either send a reset signal to the image storage unit 20 or terminate the call. A reset signal indicates that the receiving party is satisfied with the previously-transmitted image and is now ready to receive a new image from the image storage unit 20. In the event of the receipt of a reset signal from the image display unit 40 (decision block 81), the counter module 32 is reset as indicated by function block 82 and the image transmission process restarts. The reset signal is significant in that the parties may then initiate the transmission of another image, without reestablishing the line of communication, if there is another image to be transmitted. Otherwise, if the call is terminated (decision block 83), the counter module 32 is reset (function block 84) and the call ends.

Referring now to FIG. 5, the operation of the image display unit 40 is shown. The image transmission process begins when the image display unit 40 sends an image data request to the image storage unit 20 (decision block 92). If the image data request is the first such request, decision block 93 answered to the affirmative sets the routing switch 44 to main memory 46 data routing (function block 94). The counter module 58 is also incremented to take count of the number of information blocks requested (function block 95). After the image display unit 40 receives the requested image data from the image storage unit 20 (function block 96), the image data is directed by switch 44 into either the main memory 46 or the auxiliary memory 48. For the initial transmission, the switch 44 is set to route the data to the main memory 46 as shown in function block 97. The main memory 46 also serves as the storage site for the recomposed image. From there, the data is processed by the image processor 50, restored in the main memory 46, and then routed to the display 52 where the initial image $S_1$ is displayed (function block 98).

If not satisfied with the resolution after reception of the initial image $S_1$, the receiving party may increase the resolution by pressing the button 54 the number of times corresponding to the number of additional detail levels desired. Activation of the button 54 (decision block 92) leads to three events: the timer 56 is activated, a increment corresponding to the extent of activation of the button 54 is registered by the counter module 58 (function block 100), and the switch 44 is set to route the incoming additional details to the auxiliary memory 48 (function block 99). After the specified time-out, the timer 56 commands the counter module 58 to send an image data request to the image storage unit 20 corresponding to the increment registered by the counter module 58. For example, if the button 54 is pressed 2 times, a request for two information blocks is sent via the dedicated control channel DCC. Similarly, if the receiving party had activated the button 54 three times, the image storage unit 20 would be requested to transmit three information blocks containing additional image details.

The transmitted information blocks containing the additional image details are received by the image display unit 40 (function block 101) and then routed by the switch 44 to the auxiliary memory 48 (function block 102). From there, the image processor 50 combines the image in the main memory 46 with the additional image details in the auxiliary memory 48, again using wavelet techniques (function block 103). The resulting detail image is then stored in the main memory 46 (function block 104) before being routed to the display 52 (function block 98).

The process of incrementally tuning the resolution of the image continues as specified in the preceding paragraph until the receiving party is satisfied or the maximum number of details has been reached. Note further that the maximum number of details available to the receiving party may be constrained by the resolution limit of the image storage unit 20 or by an artificial limitation in the image storage unit 20 established by the transmitting party. In addition, the maximum number of details may be constrained by a parameter in the image display unit 40 which limits the amount of additional details that may be simultaneously requested by multiple activations of the button 54.

When the receiving party has procured the desired image, that party may either terminate the communication (decision block 108) or reset the image display unit 40 to receive another image (decision block 105). Even if the receiving party chooses to reset the image display unit 40, the communication may still be terminated (decision block 108). Resetting of the image display unit 40 ends the image transmission sequence for a particular image and may be accomplished by either of two means: (1) activation of the reset device 62 by the receiving party or (2) by the receiving party activating the button 54 more times than the maximum number of details that could be simultaneously requested. If an image transmission sequence for a particular image is terminated by any of these three methods, the counter module 58 is reset (function blocks 106 and 109) and a signal is transmitted to the image storage unit 20 (function blocks 107 and 110) in order to reset the counter module 32.

The described method for transmitting multiresolution image data illustrates the increased level of efficiency which may be realized by enabling the parties to the communication to determine the optimal level of resolution required when images are communicated. The interactive nature of this method also permits the parties to optimize the resolution of each image transmitted in a multi-image sequence. Thus, this method would result in significantly faster transmission of images, especially if the highest level of resolution is not required for the user's needs. Therefore, when applied to radio frequency communications, this method would serve to increase the efficiency of image communication by reducing memory requirements, bandwidth requirements, power consumption, and air time.

The present invention may, of course, be carried out in other specific ways than those herein set forth without parting from the spirit and essential character of the invention. The present embodiments are, therefore, to be considered in all respects as illustrative and not restrictive, and all changes coming within the meaning and equivalency range of the appended Claims are intended to be embraced therein.

What is claimed is:

1. A method for transmitting multiresolution image data via wireless devices in a radio frequency communication system, comprising the steps of:
    a) decomposing the image into a base image having a predetermined minimum resolution and one or more image details which can be sequentially combined with the base image to create detail images of increasingly higher resolution;
    b) storing the base image and image details as discrete information blocks in an image storage unit;
    c) transmitting the base image stored in the image storage unit to an image display unit;
    d) storing the base image in said image display unit;
    e) transmitting additional image data requests to the image storage unit;
    f) transmitting additional image details stored in the image storage unit to the image display unit in response to said additional image data requests; and
    g) recombining the additional image details with the base image at the image display unit to create a higher resolution detail image.

2. The method of claim 1 wherein the base image is stored in a main memory in said image display unit.

3. The method according to claim 2 wherein said image details are stored in an auxiliary memory in said image display unit prior to being combined with said base image.

4. The method of claim 3 wherein an image processor in the image display unit recombines said image details with the image in the main memory and stores the resultant detail image in the main memory.

5. The method of claim 4 wherein the image in said main memory is displayed on a display device.

6. The method according to claim 1 wherein the step of transmitting additional image data requests comprises sending a multiple image data request for multiple image details.

7. The method according to claim 6 wherein the step of transmitting additional image details includes transmitting multiple image details in response to a multiple image data request.

8. The method according to claim 7 wherein the step of transmitting multiple image details includes combining said multiple image details prior to transmission to said image display unit.

9. The method according to claim 7 wherein the step of transmitting multiple image details includes transmitting said image details as a string of discrete information blocks.

10. The method according to claim 1 including the step of storing at said image storage unit a count of the total number of information blocks transmitted to said image display unit.

11. The method according to claim 10 wherein the step of transmitting said image details includes determining the total number of information blocks previously transmitted to the image display unit, transmitting the next image detail, and incrementing said total count.

12. The method according to claim 1 wherein the image data requests originate from the image storage unit.

13. The method according to claim 1 further including the step of limiting the available resolution levels at the image storage unit.

14. The method according to claim 1 further including the step of limiting the availability of multiresolution image data to an authorized user.

15. A method for transmitting an image between an image storage unit and an image display unit, comprising:
    a) decomposing an image into discrete information blocks including a base image and one or more image details;
    b) storing said information blocks in said image storage unit;
    c) sending a first image data request to said image storage unit;
    d) transmitting an information block containing said base image from said image storage unit to said image display unit in response to said first image data request;
    e) displaying said base image at said image display unit;
    f) sending one or more additional image data requests to said image storage unit;
    g) transmitting additional information blocks containing image details from said image storage unit to said image display unit in response to said additional image data requests;
    h) combining at said image display unit said image details with said base image and any previous image details received by said image display unit to create a new detail image of higher resolution than the previous image; and
    i) displaying the new detail image at said image display unit.

16. The method of claim 15 wherein the base image is stored in a main memory in said image display unit.

17. The method according to claim 16 wherein said image details are stored in an auxiliary memory in said image display unit prior to being combined with said base image.

18. The method of claim 17 wherein an image processor in the image display unit recombines said image details with the image in the main memory and stores the resultant detail image in the main memory.

19. The method of claim 18 wherein the image in said main memory is displayed on a display device.

20. The method according to claim 15 wherein the step of transmitting additional image data requests comprises sending a multiple image data request for multiple image details.

21. The method according to claim 20 wherein the step of transmitting additional image details includes transmitting multiple image details in response to a multiple image data request.

22. The method according to claim 21 wherein the step of transmitting multiple image details includes combining said multiple image details prior to transmission to said image display unit.

23. The method according to claim 21 wherein the step of transmitting multiple image details includes transmitting said image details as a string of discrete information blocks.

24. The method according to claim 15 including the step of storing at said image storage unit a count of the total number of information blocks transmitted to said image display unit.

25. The method according to claim 24 wherein the step of transmitting said image details includes determining the total number of information blocks previously transmitted to the image display unit, and transmitting the next image detail, and incrementing said total count.

26. A multiresolution image transmission system comprising:

a) an image storage unit having a memory for storing a decomposed image in discrete information blocks including a base image having a predetermined minimum resolution and one or more image details which can be sequentially combined with said base image to create detail images of increasingly higher resolution;

b) an image display unit including an image display;

c) communication means linking said image storage unit with said image display unit;

d) request means for sending image data requests to said image storage unit, said image storage unit being responsive to said image data requests to send stored image data to said image display in discrete units beginning with said base image and stepping incrementally through said image details until the last image detail is reached; and e) image processing means in said image display unit for combining said base image with said image details to create detail images of increasingly higher resolution with the addition of each image detail.

27. The multiresolution image transmission system of claim 26 wherein the image display unit includes a main memory for storing the base image and any detail images to be displayed.

28. The multiresolution image transmission system according to claim 27 wherein said image display unit includes an auxiliary memory for storing said image details prior to being combined with said base image.

29. The multiresolution image transmission system according to claim 26 wherein said incremental command means comprises a push-button on said image display unit.

30. The multiresolution transmission system according to claim 29 wherein said image display unit further includes a counter for counting the presses of said push-button.

31. The multiresolution image transmission system according to claim 30 wherein said data request means further includes an elapsed time counting means for measuring the elapsed time from the initial press of said push-button, said counter being operative to count the number of times the push-button is pressed within a predetermined time period from said initial press of the push-button as measured by said elapsed time counting means.

32. The multiresolution image transmission system of claim 31 wherein said data request means is responsive to said counter to transmit said request for an additional number of information blocks equal to the value of said counter.

33. The multiresolution image transmission system according to claim 26 wherein said image storage unit includes counting means for counting the total number of information blocks transmitted to said image display unit, said image storage unit being responsive to an image data request to transmit the next information block.

* * * * *